United States Patent [19]

Walker

[11] 3,985,156

[45] Oct. 12, 1976

[54] GAS AND LIQUID FLOW CONTROL VALVE

[75] Inventor: Robert Walker, Providence, R.I.

[73] Assignee: Bristol Screw Products Corporation, Providence, R.I.

[22] Filed: Nov. 19, 1974

[21] Appl. No.: 525,151

[52] U.S. Cl. ............................ 137/637.2; 137/588; 222/4; 251/351
[51] Int. Cl.² .................. F16K 11/12; F16K 24/00
[58] Field of Search .......... 137/212, 321, 583, 588, 137/606, 637, 637.2, 637.3, 637.4, 637.5; 222/4, 145, 547, 402.17, 402.18, 489; 251/DIG. 4, 351

[56] References Cited
UNITED STATES PATENTS

| | | | |
|---|---|---|---|
| 2,791,236 | 5/1957 | Mauer | 137/614.17 |
| 3,391,570 | 7/1968 | Becker et al. | 137/637.2 X |
| 3,430,820 | 3/1969 | Winters et al. | 137/588 X |
| 3,430,821 | 3/1969 | Winters et al. | 137/588 X |

Primary Examiner—Martin P. Schwadron
Assistant Examiner—Richard Gerard
Attorney, Agent, or Firm—Christen & Sabol

[57] ABSTRACT

The disclosure relates to a gas and liquid flow control valve comprising a valve body having a bore therethrough, said bore having an inlet portion and an enlarged outlet portion separated by an annular shoulder portion, a gas inlet and a liquid inlet fixed to said inlet portion, said gas and liquid inlets being concentrically arranged with respect to each other, a first tubular valve element disposed in said outlet portion and being movable relative thereto between opened and closed positions, manually operated means exteriorly carried by said valve body and said first and second tubular valve elements, said means being selectively movable relative to said tubular valve elements whereby the same may be simultaneously moved between opened and closed oppositions, and said means including a first and second operator means for said first and second tubular valve elements, respectively, whereby one of said tubular valve elements may be operated independently of the other.

6 Claims, 5 Drawing Figures

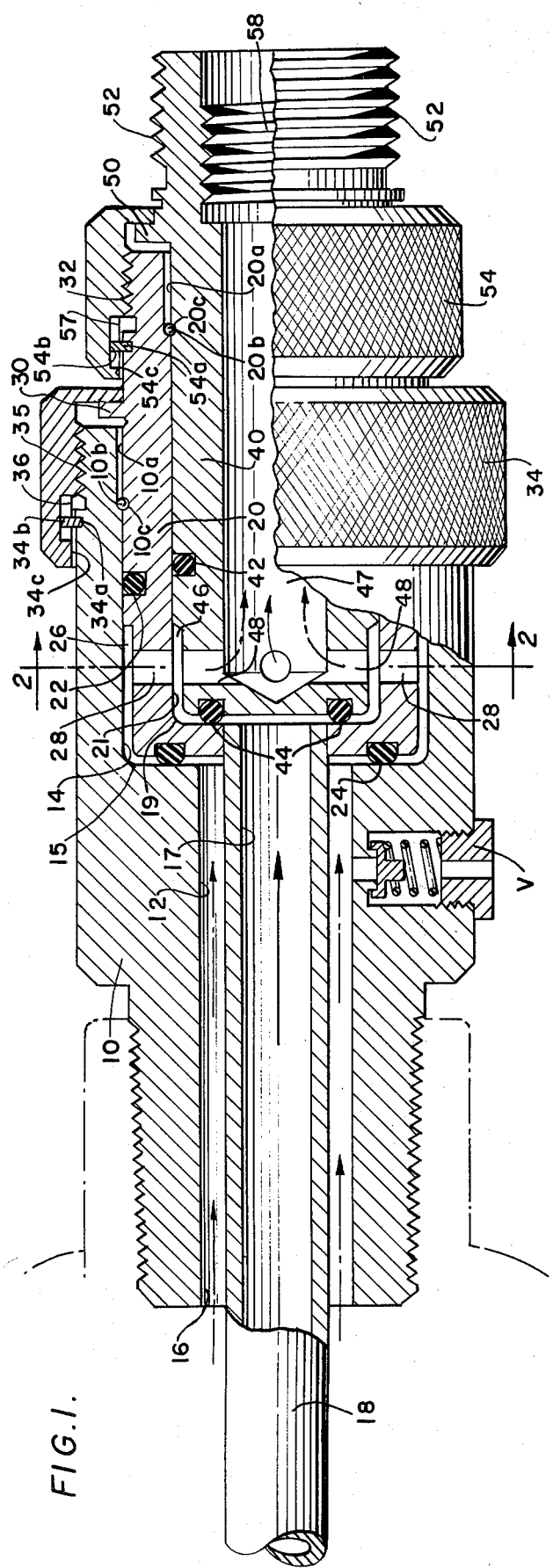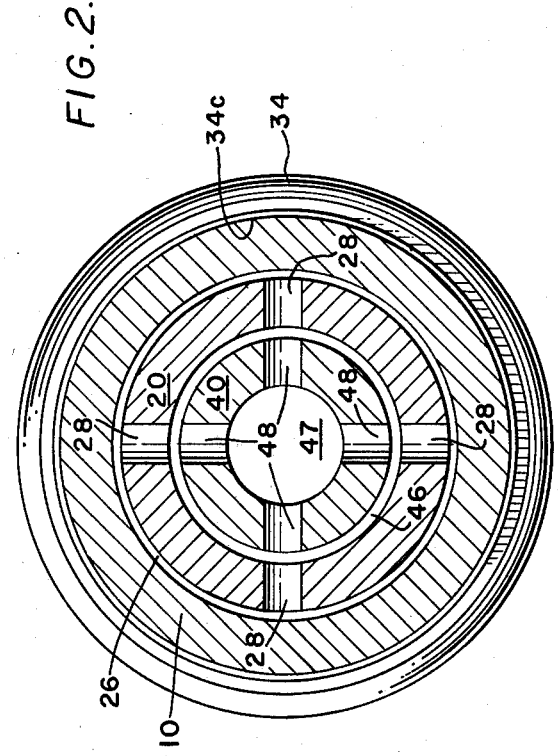

GAS AND LIQUID FLOW CONTROL VALVE

BACKGROUND OF THE INVENTION

This invention relates to valves and in particular to a specially constructed valve suitable for withdrawal of vapor or liquid from a pressurized container.

In withdrawing fluids from a pressurized vessel containing both vapor and liquid under pressure, it is sometimes desirable to withdraw vapor and at other times to withdraw liquid only. There are several valves or similar devices which, when mounted on or attached to the top of such pressure vessels permit the withdrawal of vapor or liquid selectively. Typical valves of this kind are described, for example, in U.S. Pat. Nos. 2,365,423 and 3,021,870. However, these valves as well as many others which are currently in use are often complicated to construct and expensive to fabricate.

In the shipment of refrigerants in recent years it has become increasingly necessary and commercially desirable to ship the refrigerant (usually fluorocarbons) in low-cost, pressurized cylinders without a conventional discharge valve. Simplicity of construction and economy of fabrication of such cylinders have become of paramount commercial importance and have in turn resulted in the use of so-called "disposable" cylinders which can be discarded after use by the consumer. Simplicity in cylinder construction has in turn necessitated simplicity and economy of the types of dispensing mechanisms and devices which must be employed with such cylinders.

Accordingly, this invention provides a valve device which can be readily attached on a pressurized vessel containing both vapor and liquid under pressure and which can be conveniently operated to withdraw vapor or liquid selectively. The valve described herein is simple and inexpensive to construct and is therefore readily adaptable for use with such disposable cylinders, although it is equally adaptable for reusable cylinders.

BRIEF DESCRIPTION OF THE DRAWINGS

FIG. 1 is a longitudinal sectional view partly in elevation of a gas and liquid valve embodying the present invention.

FIG. 2 is a transverse cross-sectional view taken along the line 2—2 of FIG. 1.

DESCRIPTION OF THE PREFERRED EMBODIMENTS

Figure 3:
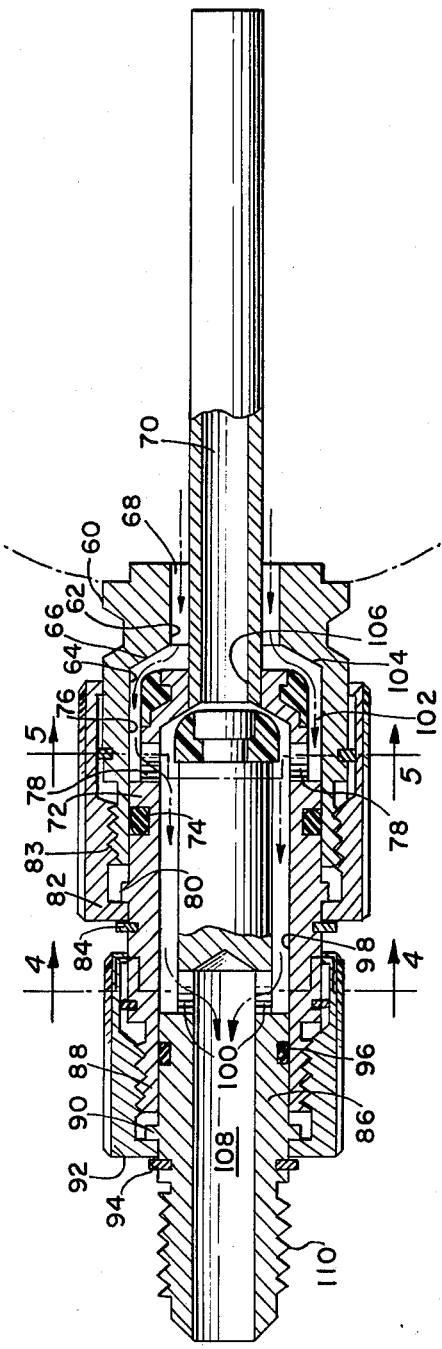
FIG. 3 is a longitudinal sectional view of another embodiment of a gas and liquid valve embodying the principles of the invention.
Figure 5:
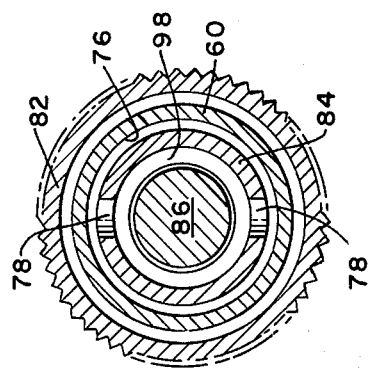
FIG. 5 is a transverse cross-sectional view taken along the line 5—5 of FIG. 3.
Figure 4:
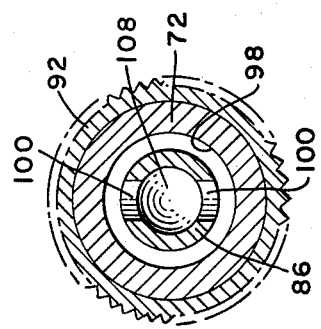
FIG. 4 is a transverse cross-sectional view taken along the line 4—4 of FIG. 3.

As is illustrated in FIG. 1, the present invention is embodied in a gas and liquid control valve including a generally hollow, cylindrical valve body 10 having an inlet portion 12 with exterior threads and an outlet portion 14 with exterior threads. The inlet and outlet portions are separated internally by an annular shoulder portion 15. A gas inlet is designated 16 and a liquid inlet 18 is fixed to first tubular valve element 20, said gas and liquid inlets 16 and 18 being concentrically arranged with respect to each other. First tubular valve element 20 is disposed in said outlet portion 14 and is movable relative thereto between opened and closed positions. Manually operated means are exteriorly carried by said valve body 10 and said first and second tubular valve elements 20 and 40, said means being selectively movable relative to said tubular valve elements 20 and 40 whereby the same may be simultaneously moved between opened and closed positions. The valve body 10 and first tubular element body 20 are each provided with a longitudinal slot 10a and 20a carrying a key in the form of a ball 10b and 20b which serve as a rotational key or stop means to prevent rotation of the second tubular element 40 within the first tubular element 20 and rotation thereof within the valve body 10. Opposite the longitudinal slots 10a and 20, the opposing surfaces of the tubular elements 20 and 40 are provided with detents 10c and 20c for locking the balls 10b and 20b. Said means includes first and second operator means for said first and second tubular valve elements 20 and 40, respectively, whereby one of said tubular valve elements may be operated independently of the other. Preferably, a conventional pressure relief safety device V is provided to comply with local safety regulations.

In another embodiment of the invention there is shown a gas and liquid control valve including a generally hollow cylindrical valve body 60 having an inlet portion 62 and an outlet portion 64. The inlet and outlet portions are separated internally by an annular shoulder portion 66. A gas inlet is designated 68 and a liquid inlet is fixed to first tubular valve element 72, said gas and liquid inlets 68 and 70 being concentrically arranged with respect to each other. First tubular valve element 72 is disposed in said outlet portion 64 and is movable relative thereto between opened and closed positions. A second tubular valve element 84 is disposed in said first tubular valve element 72 and is movable relative thereto between opened and closed positions. Manually operated means are exteriorly carried by said valve body 60 and said first and second tubular valve elements 72 and 84, said means being selectively movable relative to said tubular valve elements 72 and 84 whereby the same may be simultaneously moved between opened and closed positions. Said means includes first and second operator means for said first and second tubular valve elements 72 and 84, respectively, whereby one of said tubular valve elements may be operated independently of the other.

In operation of the valve as shown in FIG. 1 for gas withdrawal the knurled knob or locking collar 34 mounted on mounting threads 35 is rotated counter-clockwise thus opening the first tubular valve element 20. An annular recess 36 in the locking collar 34 cooperates with an annular recess 34a oppositely positioned on the outer surface of the valve body 10 carrying a compression spring wire ring 34b which is compressed into the recess 34a by the collar lower lip 34c when the collar 34 is lowered for mounting on the valve body 10, the ring 34b expanding into the recess 36 to prevent removal of the collar 34. Gas flows into inlet 16 through the inlet portion 12 in the valve body 10 by O-ring seal 24 around the annular shoulder 15 between the inlet portion 12 and the outlet portion 14 and into the inlet portion 14 and the peripheral flow channel 26 in the wall of the first tubular valve element 20 which extends between O-rings 22 and 24. Gas then flows into a plurality of transverse openings 28 in the wall of tubular valve element 20 through a plurality of transverse openings 48 in the wall of the second tubular valve element 40 into the outlet portion 47 in the second tubular valve element 40.

When liquid withdrawal is desired, the knurled knob or locking collar 54 mounted on mounting threads 32 is rotated in a counter-clockwise direction thus opening the second tubular valve element 40. An annular recess 57 in the locking collar 54 cooperates with an annular recess 54a oppositely positioned on the outer surface of the tubular element 20 carrying a compression spring wire ring 54b which is compressed into the recess 54a by the collar lower lip 54c when the collar 54 is lowered for mounting on the tubular element 20, the ring 54b expanding into the recess 57 to prevent removal of the collar 54. Liquid flows into inlet 18 through the inlet portion 17 in the valve body 10 by O-ring seal 44 around the annular shoulder 19 between the inlet portion 21 and the peripheral flow-channel 46 in the wall of the second tubular valve 40 which extends between O-rings 42 and 44. Liquid then flows into a plurality of transverse openings 48 in the wall of the second tubular valve element 40 into the outlet portion 47 in the second tubular valve element 40.

The opening and closing of the first tubular valve element 20 and the second tubular valve element 40 is controlled by the turning of the knurled knobs 34 and 54 respectively. As the first and second tubular elements 20 and 40 are longitudinally moved with respect to each other to the full open position, they are stopped by peripheral annular shoulders 30 and 50 respectively.

Exterior mounting threads 52 can be provided for adapting the valve to an additional accessory, if desired. Likewise, the second tubular valve body 40 can be provided at its outlet end with internal threads as illustrated at 58.

In operation of the valve as illustrated in the embodiment of the invention shown in FIG. 3 there is shown the valve body 60. For gas withdrawal the knurled knob or locking collar 82 mounted on mounting threads 83 is rotated in a counter-clockwise direction thus opening the first tubular valve element 72. Gas flows into inlet 68 through inlet portion 62 around the annular shoulder 66 between the inlet portion 62 and the outlet portion 64 and the peripheral flow channel 76 in the wall of the first tubular valve element 72. O-ring seal 74 prevents any gas leakage from flow channel 76. Gas then flows through a plurality of transverse openings 78 which define flow outlets from the channel 76 into a peripheral flow channel 98 provided in the wall 86 of the second tubular valve element. Gas then flows upwardly in peripheral flow channel 98 into a plurality of transverse openings 100 which define flow outlets from channel 98 into the outlet portion 108 in the second tubular valve element 86.

When liquid withdrawal is desired the knurled knob or locking collar 92 mounted on mounting threads 88 is rotated in a counter-clockwise direction thus opening the second tubular valve element 86. Liquid flows into inlet 70 through the inlet portion 106 in the valve body 60 around the annular shoulder 104 into the outlet portion 102 and the peripheral flow channel 98 in the wall of the second tubular valve element 86. Liquid then flows into a plurality of transverse openings 100 in the wall of the second tubular valve element 86 into the outlet portion 108 in the second tubular valve element 86.

The opening and closing of the first tubular valve element 72 and the second tubular valve element 86 is controlled by the turning of the knurled bushings 82 and 92 respectively. As they are turned to the full open position they are stopped by peripheral annular shoulders 80 and 90 respectively. C-shaped snap rings 84 and 94 are mounted above knurled bushings 82 and 92 respectively to retain the same on their respective first and second tubular valve elements 72 and 86.

Exterior mounting threads as shown at 110 can be provided for connecting the valve to a dispensing hose coupling or pipe, if desired.

Although the invention has been described with reference to some preferred embodiments it is not intended that the broad scope of the above-described gas-liquid flow control valve be limited thereby but that some modifications and variations are intended to be included within the spirit and scope of the invention as defined by the following claims.

What is claimed is:

1. A gas and liquid flow control valve comprising a valve body having a bore therethrough, said bore having an inlet portion and an enlarged outlet portion separated by an annular shoulder portion, a first tubular valve element disposed in said outlet portion and being movable relative thereto between opened and closed positions, a second tubular valve element disposed in said first tubular valve element and being movable relative thereto between opened and closed positions, said second tubular valve element containing an exit channel in the top portion thereof, a gas inlet and a liquid inlet, said liquid inlet fixed to and extending through said first tubular valve element, and said gas and liquid inlets concentrically arranged with respect to each other, manually operated means exteriorly carried by said valve body and said first and second tubular valve elements, said means being selectively movable relative to said tubular valve elements whereby the same may be simultaneously moved between opened and closed positions, and said means including a first and second operator means for said first and second tubular valve elements, respectively, whereby one of said tubular valve elements may be operated independently of the other, a gas flow path being open when said first tubular valve element is in the open position and being closed when said first tubular valve element is in the closed position, said gas flow path being through said gas inlet, through the opening caused by said first tubular valve being moved to the open position and through said exit channel in the top portion of said second tubular valve element, and a liquid flow path being open when said second tubular valve element is in the open position and being closed when said second tubular valve element is in the closed position, said liquid flow path being through said liquid inlet, through the opening caused by said second tubular valve being moved to the open position and through said exit channel in the top portion of said second tubular valve element.

2. The gas and liquid flow control valve of claim 1 wherein said outlet portion of said valve body communicates with a peripheral flow channel in the wall of said first tubular valve element.

3. The gas and liquid control valve of claim 2 wherein said peripheral flow channel communicates with a plurality of transversal openings in the wall of said first tubular valve element, thereby to define flow outlets from said peripheral flow channel.

4. The gas and liquid control valve of claim 3 wherein said plurality of transverse openings in the wall of said first tubular valve element communicate with a peripheral flow channel in the wall of the second tubular valve element.

5. The gas and liquid control valve of claim 4 wherein said peripheral flow channel in the wall of the second tubular valve element communicates with a plurality of transverse openings in the wall of said second tubular valve element.

6. The gas and liquid control valve of claim 5 wherein the plurality of transverse openings in the wall of said second tubular valve element communicate with said exit channel in the top portion of said second tubular valve element.

* * * * *